C. H. WHITNEY.
HAY RETAINER.
APPLICATION FILED SEPT. 22, 1908.

936,500.  Patented Oct. 12, 1909.

Witnesses.
L. W. Newby.
B. C. Viney.

Inventor:
C. H. Whitney

UNITED STATES PATENT OFFICE.

CHARLES H. WHITNEY, OF LONGMONT, COLORADO, ASSIGNOR OF ONE-HALF TO LANCE W. NEWBY, OF LONGMONT, COLORADO.

HAY-RETAINER.

936,500.   Specification of Letters Patent.   Patented Oct. 12, 1909.

Application filed September 22, 1908. Serial No. 454,255.

*To all whom it may concern:*

Be it known that I, CHARLES H. WHITNEY, a citizen of the United States, residing at Longmont, in the county of Boulder and State of Colorado, have invented a new and useful Hay-Retainer, of which the following is a specification.

My invention relates to hay retainers, being similar to none that are a success and now in use.

My invention is a device to be attached or affixed to a tooth or to some or all of the teeth of overshot hay stackers now commonly used in connection with bull rakes for stacking hay.

The objects of my invention are, first, to provide a suitable and durable mechanical device to retain the bull rake load of hay, deposited upon the stacker teeth by the bull rake, while the rake is being withdrawn therefrom; second, to provide a suitable and durable contrivance to retain the bull rake load of hay upon the stacker teeth until the load is carried, elevated or lifted from the ground into the air and is deposited or dropped by the stacker upon the stack; third, to provide a suitable and durable mechanical device that is more durable and will do more efficient work than hay retainers heretofore used; fourth, to provide a durable and cheap mechanical device to take the place of and do the work of one laborer.

I attain these objects by the mechanism illustrated in the accompanying drawings, in which—

Figure 1:
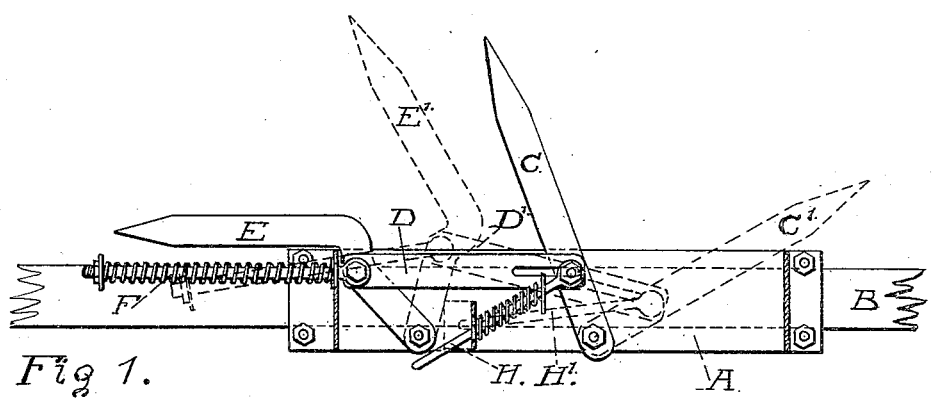
Figure 2:
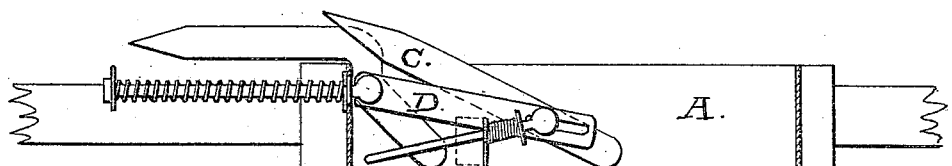
Figure 3:
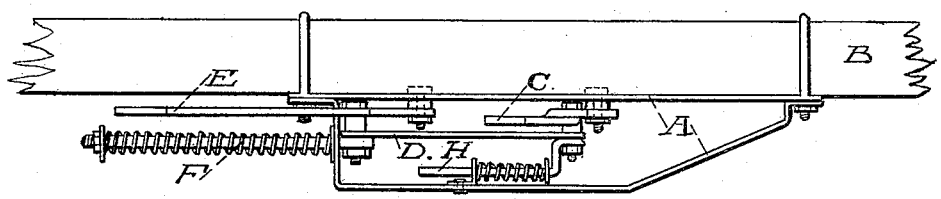

Figures 1 and 2, are elevations with a part of the framework of the device removed, showing it attached to a stacker tooth. Fig. 3, is a plan view of my entire machine showing it attached to a stacker tooth.

Similar letters refer to similar parts throughout the several views.

The sides or plates A, constitute the framework of the machine. B, is no part of my invention. It is the stacker tooth to which my invention is attached with tooth C, pointing upward. One end of the teeth E and C, are each singly secured or fastened to A, in such a manner that they will move back and forth upon the fastening as an axis. To each tooth is attached pitman D, the connection being made in such manner that it does not prevent the teeth moving back and forth. I have used the fastening that attaches the pitman D, to the teeth to attach a shaft F, to tooth E, and a shaft H, to tooth C. Before shaft H, is attached to tooth C, a coil spring of suitable length and strength is placed thereon, and one end of the shaft is passed through a guide in the frame A, and the other end is then attached to C. When C is pushed down as shown in Fig. 2, coil spring on H, is contracted and as soon as the load or weight is less than the strength of the spring, tooth C, will be pushed upward to the position it occupies in Fig. 3.

To permit C, to move independently of tooth E, as shown in Fig. 2, I have made a slot in the end of pitman D, so that the fastening which attaches D to C, moves from the outer end of the slot to the other end, thus permitting the independent movement of C; and now both teeth being down or capable of going down there is nothing to interfere with the unloading of the bull rake load upon the stacker teeth, but when the bull rake starts back the rake or hay will become caught on tooth C, because the spring on H, will cause it to rise and then C, will be pulled to an upright position and possibly to the position of $C^1$, and if it is pulled to $C^1$, it would be of no use for holding the hay on the stacker, but when C, passes a vertical position toward $C^1$, E is pulled upward by the pitman D, until it takes the position of $E^1$, and then tooth E holds the hay on the stacker until the load is dropped onto the stack, when the teeth take this position shaft H, is pulled through its guide to the position $H^1$, and D, to the position of $D^1$, and shaft F, heretofore mentioned takes a position as indicated by dotted lines in Fig. 1, but not lettered but which might properly be called $F^1$. In order to keep E from moving from its usual horizontal position beyond the position E, shaft F, before being attached to E, is passed through a guide in frame A, and then attached, a coil spring is then fitted over shaft F, the free end of the shaft is threaded to receive a nut and I have drilled a small hole through the end of the shaft to receive a key so as to prevent the nut coming off and becoming lost, the shaft is threaded for considerable distance so that the nut may be turned and thus shorten the distance on the shaft F, between the nut and the shaft guide. Shaft F, and its spring also helps to keep C, from moving to $C^1$, and when E, is pulled to E¹, they pull E, back to its usual parallel position with the stacker tooth, when the load or strain is off the teeth E and C, and C, being connected by pitman D, to E, is pulled back to its usual position as shown in Fig. 3.

I claim:

1. The combination, in a hay retainer, of two teeth connected by a pitman, one end of which has a slot therein at the place of connection, which permits one tooth to move for a short distance independently, of the other, the balance of the movement of the teeth being in conjunction one with the other, and each tooth being connected with a shaft with coil spring thereon passing through their guides, substantially as set forth.

2. The combination, in a hay retainer, of a tooth or projection that stands at almost right angles with another tooth, and is connected, with a shaft having a coil spring thereon, which shaft also passes through its guide, so that it can easily be pushed forward or backward; and is so connected with another tooth by a pitman having a slot therein that a part of the forward and backward movement is independent of the other tooth while the rest of the movement is in conjunction with the other tooth, substantially as set forth.

3. The device, of a hay retainer, having a frame with two teeth attached thereto, the teeth being attached or fastened together by a pitman having a slot in one end and each tooth having attached to it a shaft with a coil spring thereon in such manner that the teeth will be held in position or will be pulled into such position that they will perform the service intended, substantially as set forth.

4. The device of a hay retainer, having a frame with two teeth attached thereto a pitman with a slot therein connecting the two teeth together and each having a shaft with coil spring thereon attached and a guide for each shaft, substantially as set forth.

CHARLES H. WHITNEY.

Witnesses:
  LANCE W. NEWBY,
  JULIUS E. BUMP.

It is hereby certified that in Letters Patent No. 936,500, granted October 12, 1909, upon the application of Charles H. Whitney, of Longmont, Colorado, for an improvement in "Hay-Retainers," an error appears requiring correction, as follows: In the grant and in the printed head of the specification it is stated that said Whitney assigned one-half of his interest to Lance W. Newby, whereas, it should have been stated that said Whitney assigned *one-third to Lance W. Newby;* and that the said Letters Patent should be read with this correction therein that the same may conform to the record of the case in the Patent Office.

Signed and sealed this 16th day of November, A. D., 1909.

[SEAL.]

E. B. MOORE,
*Commissioner of Patents.*